United States Patent
Lyman

(10) Patent No.: US 8,787,548 B2
(45) Date of Patent: *Jul. 22, 2014

(54) SYSTEM AND METHOD FOR DISTRIBUTED COMMUNICATION CONTROL WITHIN AN ENTERPRISE

(75) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/601,965

(22) Filed: Aug. 31, 2012

(65) Prior Publication Data

US 2013/0108035 A1 May 2, 2013

Related U.S. Application Data

(63) Continuation of application No. 12/075,411, filed on Mar. 10, 2008, now Pat. No. 8,341,535.

(60) Provisional application No. 60/906,024, filed on Mar. 9, 2007.

(51) Int. Cl.
*H04M 3/42* (2006.01)
*H04M 3/00* (2006.01)
*H04M 5/00* (2006.01)
*G06F 9/54* (2006.01)
*H04L 12/58* (2006.01)
*H04M 7/00* (2006.01)
*H04M 3/436* (2006.01)
*G06F 3/0481* (2013.01)

(52) U.S. Cl.
CPC .............. *G06F 3/0481* (2013.01); *G06F 9/542* (2013.01); *H04L 51/04* (2013.01); *H04M 7/0045* (2013.01); *H04M 3/4365* (2013.01); *H04M 3/42314* (2013.01); *H04M 3/42365* (2013.01); *H04L 12/581* (2013.01)
USPC ............ 379/207.02; 379/201.01; 379/201.02; 379/265.05

(58) Field of Classification Search
USPC ............. 379/218.02, 207.02, 201.01, 201.02, 379/265.05, 201.1; 709/204
See application file for complete search history.

(56) References Cited

U.S. PATENT DOCUMENTS 4,653,090 A 3/1987 Hayden
5,533,110 A 7/1996 Pinard et al.
(Continued)

FOREIGN PATENT DOCUMENTS

WO WO2004049121 6/2004
WO WO2005036330 4/2005
WO WO2006020168 2/2006

OTHER PUBLICATIONS

Parmar, Rashik "Enhanced Enterprise Communication: Transforming the bank into a proactive relationship center." IBM Global Services. May 2004.

(Continued)

*Primary Examiner* — Thjuan K Addy
(74) *Attorney, Agent, or Firm* — Carr & Ferrell LLP

(57) ABSTRACT

Systems and methods for providing distributed call control are provided. In exemplary embodiments, a communication user interface is provided on a client device associated with an individual. The communication user interface comprises a plurality of selectable communication control operations configured to provide control over communications of users within an enterprise. A selection of one of the plurality of communication control operations is received from the individual. Permissions associated with the individual are reviewed to determine if the individual is allowed to perform the communication control operation. If the individual is allowed, the communication control operation is performed. If the individual is not allowed, a denial indicator may be provided.

20 Claims, 5 Drawing Sheets

(56) References Cited

U.S. PATENT DOCUMENTS

| | | | |
|---|---|---|---|
| 5,754,636 A | 5/1998 | Bayless et al. |
| 5,854,834 A | 12/1998 | Gottlieb et al. |
| 5,940,488 A | 8/1999 | DeGrazia et al. |
| 6,067,525 A | 5/2000 | Johnson et al. |
| 6,104,711 A | 8/2000 | Voit |
| 6,137,869 A | 10/2000 | Voit et al. |
| 6,282,574 B1 | 8/2001 | Voit |
| 6,359,880 B1 | 3/2002 | Curry et al. |
| 6,389,132 B1 | 5/2002 | Price |
| 6,400,719 B1 | 6/2002 | Chimura et al. |
| 6,418,214 B1 | 7/2002 | Smythe et al. |
| 6,430,275 B1 | 8/2002 | Voit et al. |
| 6,430,289 B1 | 8/2002 | Liffick |
| 6,453,038 B1 | 9/2002 | McFarlane et al. |
| 6,628,765 B1 | 9/2003 | Bangs et al. |
| 6,718,030 B1 | 4/2004 | Turner et al. |
| 6,782,412 B2 * | 8/2004 | Brophy et al. | 709/204 |
| 6,820,083 B1 | 11/2004 | Nagy et al. |
| 6,937,703 B1 | 8/2005 | Andreason |
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,274,781 B2 | 9/2007 | Lipton et al. |
| 7,333,976 B1 | 2/2008 | Auerbach et al. |
| 7,441,002 B1 | 10/2008 | Catchpole et al. |
| 7,477,730 B2 | 1/2009 | Starbuck et al. |
| 7,496,185 B1 | 2/2009 | Primavesi et al. |
| 7,496,189 B2 | 2/2009 | Clarisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,606,221 B2 | 10/2009 | Artru et al. |
| 7,664,096 B2 | 2/2010 | Doherty et al. |
| 7,664,495 B1 | 2/2010 | Bonner et al. |
| 7,685,010 B2 | 3/2010 | Goldberg et al. |
| 7,706,522 B2 | 4/2010 | Shaffer et al. |
| 7,711,104 B1 | 5/2010 | Flockhart et al. |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 | 7/2011 | Croak et al. |
| 8,098,810 B2 | 1/2012 | Lyman |
| 8,131,872 B2 | 3/2012 | Kennedy et al. |
| 8,132,001 B1 | 3/2012 | Patten et al. |
| 8,214,265 B2 | 7/2012 | Peters |
| 8,223,941 B2 | 7/2012 | White et al. |
| 8,341,535 B2 | 12/2012 | Lyman |
| 8,379,832 B1 | 2/2013 | Lyman |
| 8,495,653 B2 | 7/2013 | Lyman |
| 8,499,246 B2 | 7/2013 | Lyman |
| 8,571,202 B2 | 10/2013 | Lyman |
| 8,693,659 B2 | 4/2014 | Lyman |
| 8,719,386 B2 | 5/2014 | Lyman et al. |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0026414 A1 | 2/2003 | Baker et al. |
| 2003/0078986 A1 | 4/2003 | Ayres et al. |
| 2003/0219029 A1 | 11/2003 | Pickett |
| 2003/0228010 A1 | 12/2003 | Clarisse et al. |
| 2004/0001573 A1 | 1/2004 | Gusler et al. |
| 2004/0039889 A1 | 2/2004 | Elder et al. |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 | 5/2004 | Wick |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gusler et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0111440 A1 | 5/2005 | Artru et al. |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0100923 A1 | 5/2006 | Courchesne |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 | 8/2006 | Song et al. |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto et al. |
| 2006/0256942 A1 | 11/2006 | Gatzke et al. |
| 2006/0288099 A1 | 12/2006 | Jefferson et al. |
| 2007/0011337 A1 | 1/2007 | Brown et al. |
| 2007/0061197 A1 | 3/2007 | Ramer et al. |
| 2007/0078708 A1 | 4/2007 | Yu et al. |
| 2007/0165640 A1 | 7/2007 | Fitchett et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0031228 A1 | 2/2008 | Gallant |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun et al. |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |

(56) References Cited

U.S. PATENT DOCUMENTS

| | | |
|---|---|---|
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2010/0174807 A1 | 7/2010 | Lyman et al. |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2011/0306298 A1 | 12/2011 | Lyman |
| 2012/0266080 A1 | 10/2012 | Zellner et al. |
| 2013/0022038 A1 | 1/2013 | Cadiz et al. |
| 2013/0148800 A1 | 6/2013 | Lyman |
| 2013/0243181 A1 | 9/2013 | Sirstins et al. |
| 2013/0268866 A1 | 10/2013 | Lyman |
| 2013/0268948 A1 | 10/2013 | Lyman |
| 2014/0029745 A1 | 1/2014 | Lyman |

OTHER PUBLICATIONS

Montgomery, Warren & Copeland, Rebecca "Network Intelligence for Presence Enhanced Communication." Nov. 2001. http://tools.ietf.org/id/draft-montgomery-copeland-presence-spirits-00.txt.

Ott, Jorg "Presence Aggregation in Endpoints." Technologiezentrum Informatik, Jan. 2003.

Broder, et al., Search Advertising Using Web Relevance Feedback, 2008, pp. 1013-1022, Conference on Information and Knowledge Management, Proceeding of the 17th AC conference on Information and Knowledge Management. Yahoo Research. Oct. 2008.

Hull, et al., Enabling Context-Aware and Privacy-Conscious User Data Sharing, 2004, Proceedings of the 2004 IEEE International Conference on Mobile Data Management. Aug. 2004. Accessed Aug. 2011. http://ieeexplore.ieee.org/xpl/freeabs_all.jsp?arnumber=1324414.

Inter-Tel, Inc. "Advanced Applications Design Guide for Contact Center Suite." Issue 1. Apr. 2006.

User Guide, What is Xact View? Xact View User Guide, Schmooze Communications LLC 2008. Accessed Aug. 2011. www.schmoozecom.com. http://literature.schmoozecom.com/XactView/UserGuide/UserGuideXactView.pdf.

Final Office Action, Jul. 23, 2013, U.S. Appl. No. 11/827,314, filed Jul. 11, 2007.

Non-Final Office Action, May 24, 2013, U.S. Appl. No. 13/213,020, filed Aug. 18, 2011.

Non-Final Office Action, May 7, 2013, U.S. Appl. No. 13/738,841, filed Jan. 10, 2013.

Final Office Action, Aug. 13, 2013, U.S. Appl. No. 11/506,279, filed Aug. 17, 2006.

Advisory Action, Oct. 4, 2013, U.S. Appl. No. 11/827,314, filed Jul. 11, 2007.

Final Office Action, Oct. 8, 2013, U.S. Appl. No. 12/228,301, filed Aug. 11, 2008.

Final Office Action, Oct. 7, 2013, U.S. Appl. No. 12/319,693, filed Jan. 8, 2009.

Non-Final Office Action, Sep. 5, 2013, U.S. Appl. No. 12/405,197, filed Mar. 16, 2009.

Final Office Action, Oct. 31, 2013, U.S. Appl. No. 12/405,204, filed Mar. 16, 2009.

Notice of Allowance, Aug. 15, 2013, U.S. Appl. No. 13/738,841, filed Jan. 10, 2013.

Notice of Allowance, Nov. 27, 2013, U.S. Appl. No. 11/827,314, filed Jul. 11, 2007.

Final Office Action, Nov. 22, 2013, U.S. Appl. No. 12/228,301, filed Aug. 11, 2008.

Advisory Action, Jan. 29, 2014, U.S. Appl. No. 12/228,301, filed Aug. 11, 2008.

Notice of Allowance, Jan. 7, 2014, U.S. Appl. No. 12/319,693, filed Jan. 8, 2009.

Non-Final Office Action, Dec. 9, 2013, U.S. Appl. No. 13/213,020, filed Aug. 18, 2011.

Non-Final Office Action, Jan. 14, 2014, U.S. Appl. No. 13/908,974, filed Jun. 3, 2013.

Non-Final Office Action, Nov. 25, 2013, U.S. Appl. No. 14/036,977, filed Sep. 25, 2013.

Notice of Allowance, Feb. 14, 2014, U.S. Appl. No. 11/506,279, filed Aug. 17, 2006.

Non-Final Office Action, Feb. 12, 2014, U.S. Appl. No. 12/405,197, filed Mar. 16, 2009.

Non-Final Office Action, Feb. 25, 2014, U.S. Appl. No. 12/405,204, filed Mar. 16, 2009.

\* cited by examiner

SYSTEM AND METHOD FOR DISTRIBUTED COMMUNICATION CONTROL WITHIN AN ENTERPRISE

CROSS-REFERENCE TO RELATED APPLICATION

The present application is a continuation of and claims the priority benefit of U.S. patent application Ser. No. 12/075,411 filed Mar. 10, 2008 now U.S. Pat. No. 8,341,535 and entitled "System and Method for Distributed Communication Control within an Enterprise," which claims the priority benefit of U.S. Provisional Patent Application No. 60/906,024 filed Mar. 9, 2007, and entitled "Real-Time Call Management System," all of which are hereby incorporated by reference. The present application is also related to U.S. patent application Ser. No. 11/827,314, filed Jul. 11, 2007 and entitled "Systems and Method for Centralized Presence Management of Local and Remote Users," U.S. patent application Ser. No. 12/075,401, filed Mar. 10, 2008 and entitled "System and Method for Providing Single Click Enterprise Communication," and U.S. patent application Ser. No. 12/075,402, filed Mar. 10, 2008 and entitled "System and Method for Event Driven Browser Launch," all of which are also incorporated by reference.

BACKGROUND OF THE INVENTION

1. Field of the Invention

Embodiments of the present invention relate generally to communication systems and more particularly to communication control of local and remote users within an enterprise.

2. Description of Related Art

In convention work environments, users within an organization may want an ability to perform actions associated with communications. Such actions may include transferring calls, monitoring communications, and recording calls. This may be especially important in a call center or customer service department where calls may need to be transferred between agents (i.e., user) or calls may be monitored. Furthermore, employers may be interested in seeing, hearing, and verifying productivity and effectiveness of their employees.

Conventionally, software applications that allow a user to monitor phone calls (i.e., determine status and record) of local users exist. Typically, the local users all access phone calls via a PBX system that can provide the status or monitoring functionalities. However, these conventional software applications are directed only to monitoring the status of phone calls. Other communication means, such as chat, cannot be monitored via these conventional software applications. Furthermore, these systems do not provide mechanisms whereby different users are granted different rights to monitor other users in an automated manner.

Presently, many individuals work at least part time out of the office, either from home or from the "road". While conventional software applications may allow for monitoring of local users, these software applications cannot be applied to monitoring remote users.

As a result of the above mention problems, there is a need for a system that can provide distributed communication control of local and remote users.

SUMMARY OF THE INVENTION

Embodiments of the present invention provide systems and methods for providing distributed call control. In exemplary embodiments, a communication user interface is provided on a client device associated with an individual. The user interface comprises a plurality of selectable communication control operations configured to provide control over communications of users within an enterprise. The users may be listed on the user interface along with their status.

A selection of one of the plurality of communication control operations is received from the individual. In exemplary embodiments, the receipt of the selection may trigger a review of permissions for the individual. Specifically, permissions for performing the selected communication control for the selected user(s) (i.e., users whose communication is being controlled by the individual) are reviewed.

If the permissions allow the communication control operation to be performed with respect to the selected users, then the communication control operation may be executed. However, if the permissions do not allow the communication control operation with respect to the selected user(s), a denial indicator may be provided.

DETAILED DESCRIPTION OF EXEMPLARY EMBODIMENTS

Embodiments of the present invention provide systems and methods for providing distributed communication control of users within an enterprise. The users may comprise both local and remote users. In exemplary embodiments, permissions associated with users of an enterprise are reviewed in order to determine various communication control operations enabled for each user. It should be noted that enterprise as applied herein may comprise any type of organization or collection of individuals. Examples of enterprises may include a business, educational institution, firm, call center, or any other type of entity whereby a group of individual users may be centrally organized, even if geographically disparate.

Figure 1:
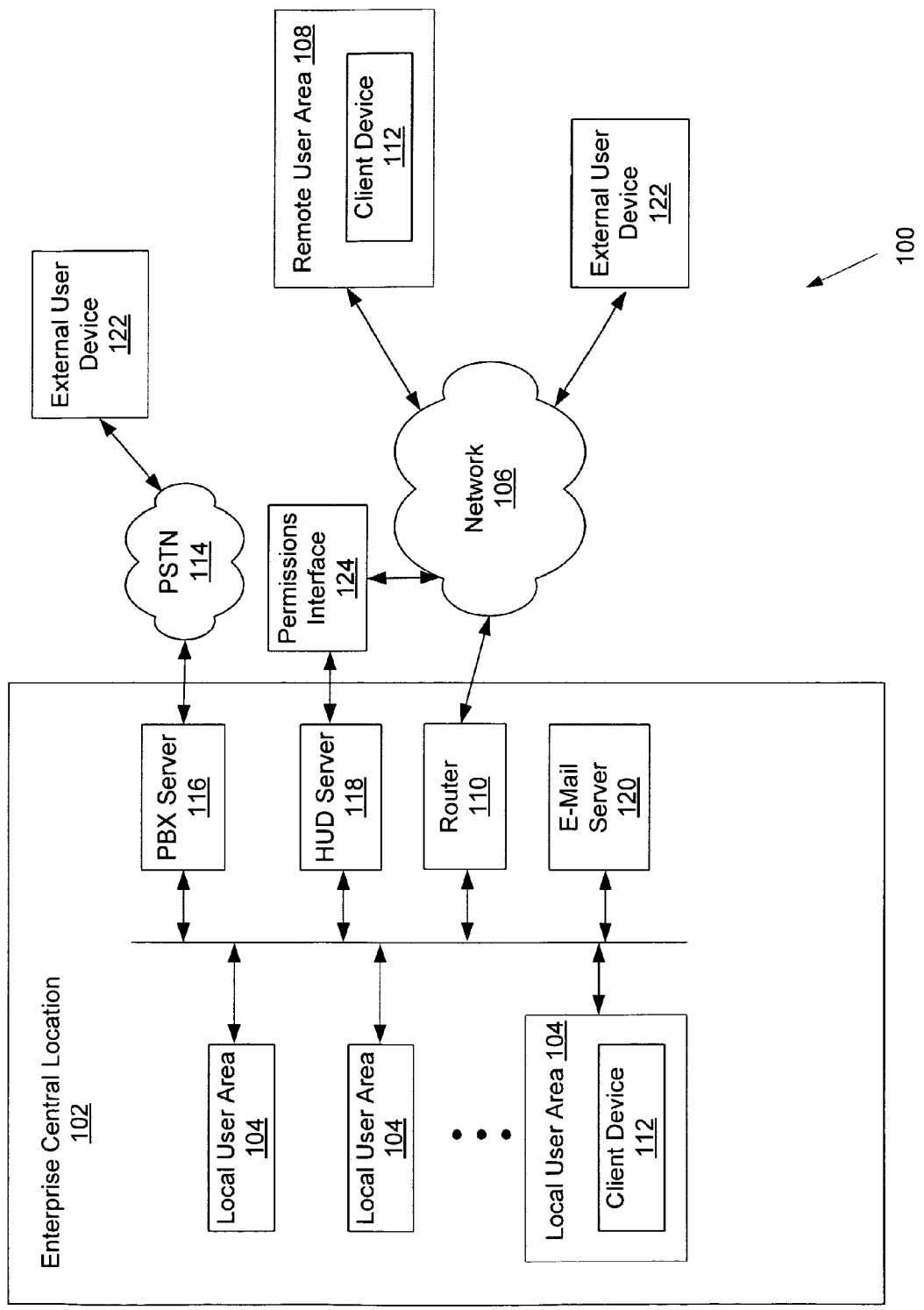
FIG. 1 is a diagram of an exemplary environment in which embodiments of the present invention may be practiced.

FIG. 1 shows an exemplary environment 100 in which embodiments of the present invention may be practiced. The exemplary environment 100 comprises an enterprise central location 102 which includes a plurality of local user areas 104. The enterprise central location 102 may be, for example, a main office and the local user areas 104 may include individual offices and/or cubicles and/or branch offices. Each local user area 104 may be associated with an individual user. It should be noted that any number of local user areas 104 may be provided within the enterprise central location 102. It should also be noted that more than one enterprise central location may be coupled via a network 106 to provide embodiments of the present invention.

The network 106 may comprise the Internet or any other wide area network. In some embodiments, the network 106 may couple the enterprise central location 102 to one or more remote user areas 108 via a router 110 or gateway. The remote user area 108 may be a location associated with an individual that remotely accesses the enterprise central location 102. For example, the remote user area 108 may be a home office of an employee associated with the enterprise central location 102.

The remote user area 108 may comprises a remote client device 112 (e.g., a computer), which may function as a communication device. One or more additional communication devices (e.g., analog telephone, VoIP device, cellular phone, laptop computer) may also be provided in the remote user area 108. Any number of remote user areas 108 may be coupled to the enterprise central location 102. Additionally, it should be noted that "remote" as used herein refers to any environment external to the enterprise central location 102.

According to exemplary embodiments, the users within both the enterprise central location 102 and the remote user areas 108 may exchange communications via the network 106. For example, the users may receive an e-mail or instant message which may be forwarded via the network 106. In other embodiments, the users may receive or place phone calls using any telephony device (e.g., desk phone, VoIP device, cellular phone). The phone call may be placed using the network 106 (e.g., VoIP) or placed via a public switch telephone network (PSTN) 114 (e.g., analog phone).

The enterprise central location 102 may comprise a plurality of local user areas 104 coupled to the router 110, a PBX server 116, a heads-up display (HUD) server 118, an e-mail server 120, and/or other communication servers via a local area network (LAN).

Each local user area 104 may also comprise the client device 112. In exemplary embodiments, the client device 112 may comprise a desktop computer, laptop, or any other digital communication device enabled to provide a communications user interface, such as the user interface that will be discussed in connection with FIG. 4. The exemplary client device 112, itself, is configured to be a communication device. As such, the client device 112 may be configured to provide access to e-mail, instant messaging (e.g., chat), VoIP, or any other communication types. In some embodiments, the client device 112 may also provide presence management information (e.g., status) and call control functionalities to the user based on permissions. The client device 112 will be discussed in more detail in connection with FIG. 3.

It should be noted that other communication devices may be present in the local user area 104 and/or remote user area 108. These communication devices may comprise a device separate from the client device 112, such as for example, an analog telephone or cellular phone.

In accordance with one embodiment, the enterprise central location 102 is coupled in communication via the router 110 to the network 106 and via the PBX server 116 to the PSTN 114. The PBX server 116 is configured to allow the client device 112 and/or other communications devices to make phone calls via the PSTN 114. In some embodiments, the PBX server 116 may be an iPBX server capable of serving VOIP communications.

The HUD server 118 is configured to manage communications and provide a gateway interface to other servers of the enterprise central location 102. In exemplary embodiments, the HUD server 118 manages presence information and user permissions at a server level. The presence information and user permissions may, in some embodiments, be broadcast to the client devices 112 at the local and remote user areas 104 and 108. The HUD server 118 will be discussed in more details in connection with FIG. 2.

One or more communication servers are provided within the enterprise central location 102. These communication servers may establish, maintain, and/or facilitate communications between users within the enterprise central location 102 and with external users located at external user devices 122. In some embodiments, the communication servers may also determine status of users with respect to communications handled by the communication servers. In the present embodiment, communication servers shown include the PBX server 116 and the e-mail server 120. The communication servers may also include, for example, a chat server or any server configured to facilitate communication exchange.

The external user device 122 may comprise any communication device that is used by an external user to communicate with users associated with the enterprise (i.e., local and remote users). The external user may be any individual that is not an employee of the enterprise, such as a customer, vendor, partner, and so forth.

In some embodiments, the communication devices at the local and remote user areas 104 and 108 may comprise devices coupled in communication with the various communication servers (e.g., PBX server 116). As such, communications handled by these communication devices may be directed through the appropriate communication server. Thus for example for local communication devices, the device (e.g., analog phone or IP phone) may be coupled to the PBX server 116, or a digital device (e.g., an IP phone, client device 112) may be coupled to the PBX server 116 via the router 110 or hub, or alternatively exchange communications via the network 106.

In some embodiments, the remote communication device comprises an IP device (e.g., digital phone). In these embodiments upon start-up, the remote device may automatically search for, and connect to, for example, the PBX server 116 by searching for a PBX identifier or IP address which, in some embodiments, is a DNS host name (e.g., the domain name) of the PBX server 116. Accordingly, the remote device may establish a communication path which recurses through a standard DNS infrastructure on the network 106 until it reaches an enhanced DNS server. Based on the requested identifier or DNS host name, the enhanced DNS server provides a current corresponding location (i.e., IP addresses) for the PBX server 116. More details regarding the process for configuring and using the remote telephony device may be found in U.S. patent application Ser. No. 11/506,279, filed Aug. 17, 2006, and entitled "Mobile Use of a PBX System," which is hereby incorporated by reference.

In embodiments where the remote device comprises an analog device, the remote device may initiate outbound communications, but the communication may not be tracked by the communication servers of the enterprise central location 102. However, incoming communications directed to the remote, analog device may be received and routed through the communication server, thus enabling the communication server (e.g., the PBX server 116 or e-mail server 120) to track the status of the remote analog device on incoming communications.

In exemplary embodiments, a permissions interface 124 is coupled in communication to the HUD server 118. The permissions interface 124 allows an individual (e.g., the user or an administrator) to set up permissions for access to presence management information and for communication control functionalities. In some embodiments, the permissions interface 124 comprises a web-based interface. As such, the individual may provide a password to access the permissions interface 124 from any location that provides web access. For example, the individual may make changes or set up new permissions from home. The permissions may then be saved to a centralized database. Copies of the permissions may then be copied to a permissions database on the HUD server 118. In some embodiments, the permissions may be updated to the HUD server 118 in real-time.

In alternative embodiments, the permissions interface 124 may be embodied within the HUD server 118 or be coupled to the HUD server 118 from within the enterprise central location 102. In some of these embodiments, the permissions may be directly written to the permission database in the HUD server 118.

According to one embodiment, permissions may be set based on groups. For example, a group or one or more users may be designated with a group name by an individual (e.g., administrator). Permissions for this group are then established. As such, the group may be able to view extensions of everyone in an executive team and record the calls of everyone in the executive team. However, the group cannot drag calls away from executive team members. All of these permissions/rights over the executive team may be labeled "group permission 1." The group may have a different set of permissions over a sales team. For example, the group may be able to see who is logged in and record calls of every member of the sales team. As such, the permissions/rights over the sales team may be labeled "group permission 2." Any number of group permissions may be established for the group, any number of groups may have established group permissions, and any number of groups may be associated with an individual of the client device 112.

Additionally, the teams may be established by the individual. Each team may comprise one or more (local and remote) users over whom the present user will have rights to view presence management information and perform communication control functionalities on. The individual may create, name, and add local or remote users to each team. It should be noted that each individual may be associated with any number of customized teams over whom they have rights to access presence management information and perform communication control functionalities on.

It should be noted that the environment 100 of FIG. 1 is exemplary. Alternative embodiments may comprise any number of enterprise central locations 102, remote user areas 108, client devices 112, and communication devices.

Figure 2:
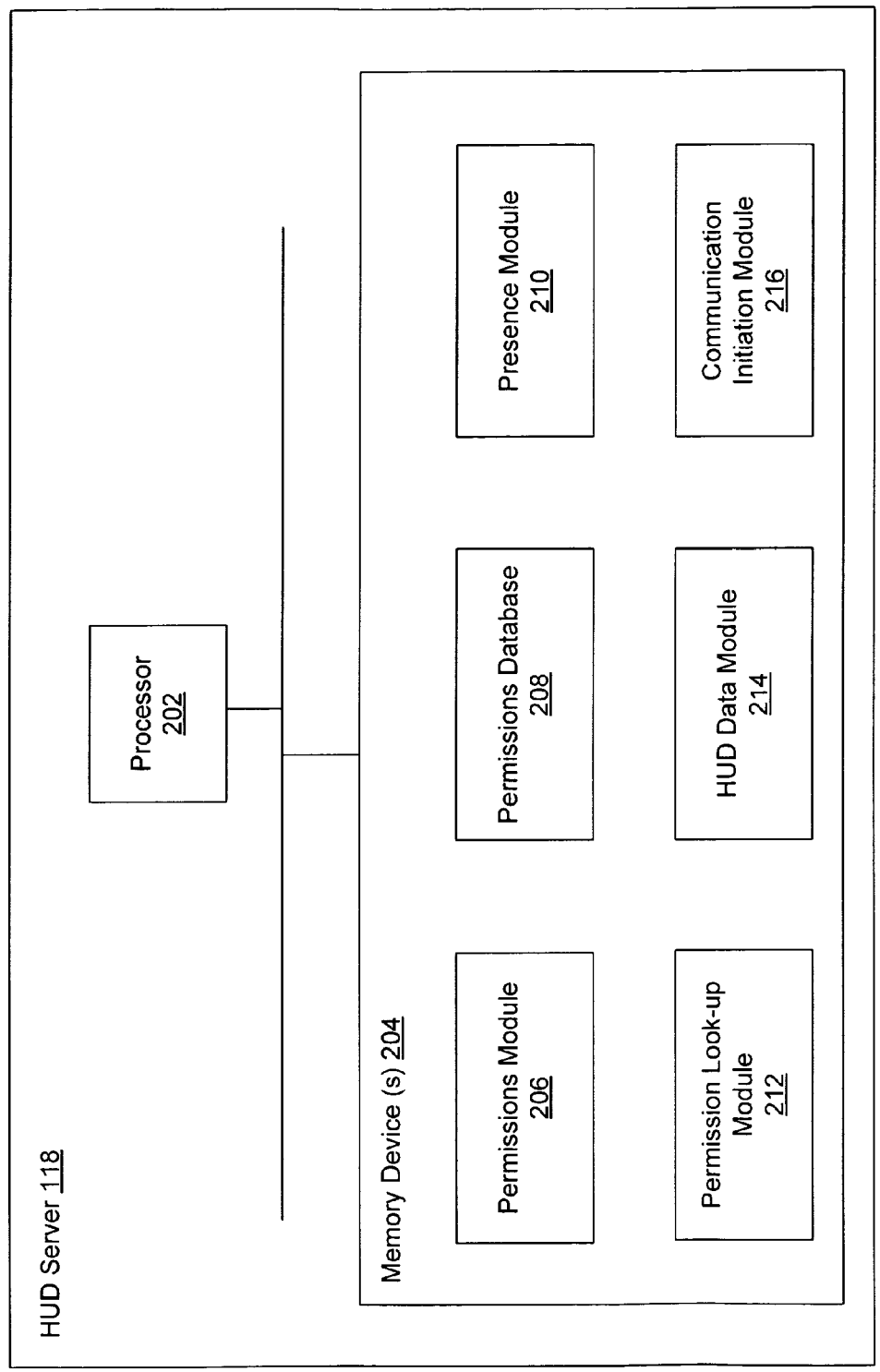
FIG. 2 is a block diagram of an exemplary HUD server.

Referring now to FIG. 2, the exemplary HUD server 118 is shown in more detail. The exemplary HUD server 118 is a communication management system which may comprises a processor 202 and one or more memory devices or storage mediums 204. The memory device 204 may comprise a permissions module 206, a permissions database 208, a presence module 210, a permission look-up module 212, a HUD data module 214, and a communication initiation module 216. Alternative embodiments may comprise more, less, or functionally equivalent engines and modules. For example, a chat engine may be embodied within the HUD server 118. In this example, chat status of local and remote users may be easily detected and utilized by the presence module 210.

The exemplary permissions module 206 is configured to manage permissions at a server level. In an embodiment utilizing a separate permission interface module 124 coupled to the HUD server 118, the permission interface 124 receives copies of permission data from a centralized database associated with the permissions interface 124. Copies of the permission data may then be stored in the permissions database 208. In some embodiments the permission may be associated with a profile for each user. Alternatively, the permissions interface 124 may be embodied within the permissions module 206. That is, the permission module 206 may launch a user interface through which individuals may set up permissions for themselves and/or others.

As previously discussed, the permissions are set up and updated by the permissions interface 124 and eventually stored in the permissions database 208 and/or another central database. In exemplary embodiments, the permissions determine which client devices 112 are allowed to receive and display presence information and/or what communication control functionalities each client device 112 are enabled to performed. The functionalities provided to the users of the associated client device 112 may include, for example, barging a call, recording a call, monitoring a communication, and rerouting communications.

The exemplary presence module 210 is configured to maintain communication status of local and remote users. The communication status may include the user's status with respect to, for example, phone calls (e.g., available for a phone call, on a queue call, on an outgoing call), chat/instant messaging (e.g., available or non available), e-mail, and cellular phone availability. The presence module 210 may receive status from other communication servers (e.g., e-mail server, chat server) or communication modules (e.g., chat engine/module embodied within the HUD server 118).

For communications directed through the PBX server 116, the PBX server 116 will know the status of associated communication devices/client devices 112. The PBX server 116 may then forward the telephony status to the presence module 210. In some embodiments, the status may be forwarded periodically (e.g., every 2 minutes), as soon as a change is detected (e.g., a user picks up a line of the telephony device), or continuously in real-time. In other embodiments, the presence module 210 may pull the telephony status from the PBX server 116 periodically or continuously.

In some embodiments, the PBX server 116 may send a packet to a remote communication device/client device 112 to determine the status of the remote device. If, for example, a response to the packet takes more than one second to return to the PBX server 116, the remote device may be considered not available. As such, the PBX server 116 polls the remote device. The polling may occur periodically or continuously. Alternatively, the remote communication device/client device 112 may periodically provide their status to the HUD server 118.

The permission look-up module 212 is configured to determine permissions for each user associated with the client device 112. Ideally, the client devices 112 are assigned to a specific user and/or the user logs in to utilize the client device 112. Based on the user identity and/or login, the permission look-up module 212 may determine the associated permissions, and direct the HUD data module 214 to provide the presence information to the proper client device 112. In other embodiments, the permission look-up module 212 may determine which client device 112 should receive which set of permissions and direct the permissions module 206 to broadcast the proper permissions. In some embodiments, some or all of the permission data stored in the permissions database 208 may also be broadcasted by the permissions module 206 to one or more appropriate client devices 112. For examples, individuals within a sales group may receive permission data established for the sales group. The HUD data module 214 may provide other information stored at the HUD server 118 or passed through the HUD server 118.

The presence information may then be displayed utilizing a graphical user interface on the client device 112, which allows tracking of local and remote users on the user interface. An example of the user interface is shown and will be described in more details in FIG. 4.

The exemplary communication initiation module 216 may be configured to route instructions to and from appropriate communication servers to establish and maintain a communication. In one embodiment, the communication initiation module 216 is configured to initiate a communication based on a communication request received from the client device 112. Once the request is received, the communication initiation module 216 sends instructions to appropriate modules or servers to establish the communication.

Figure 3:
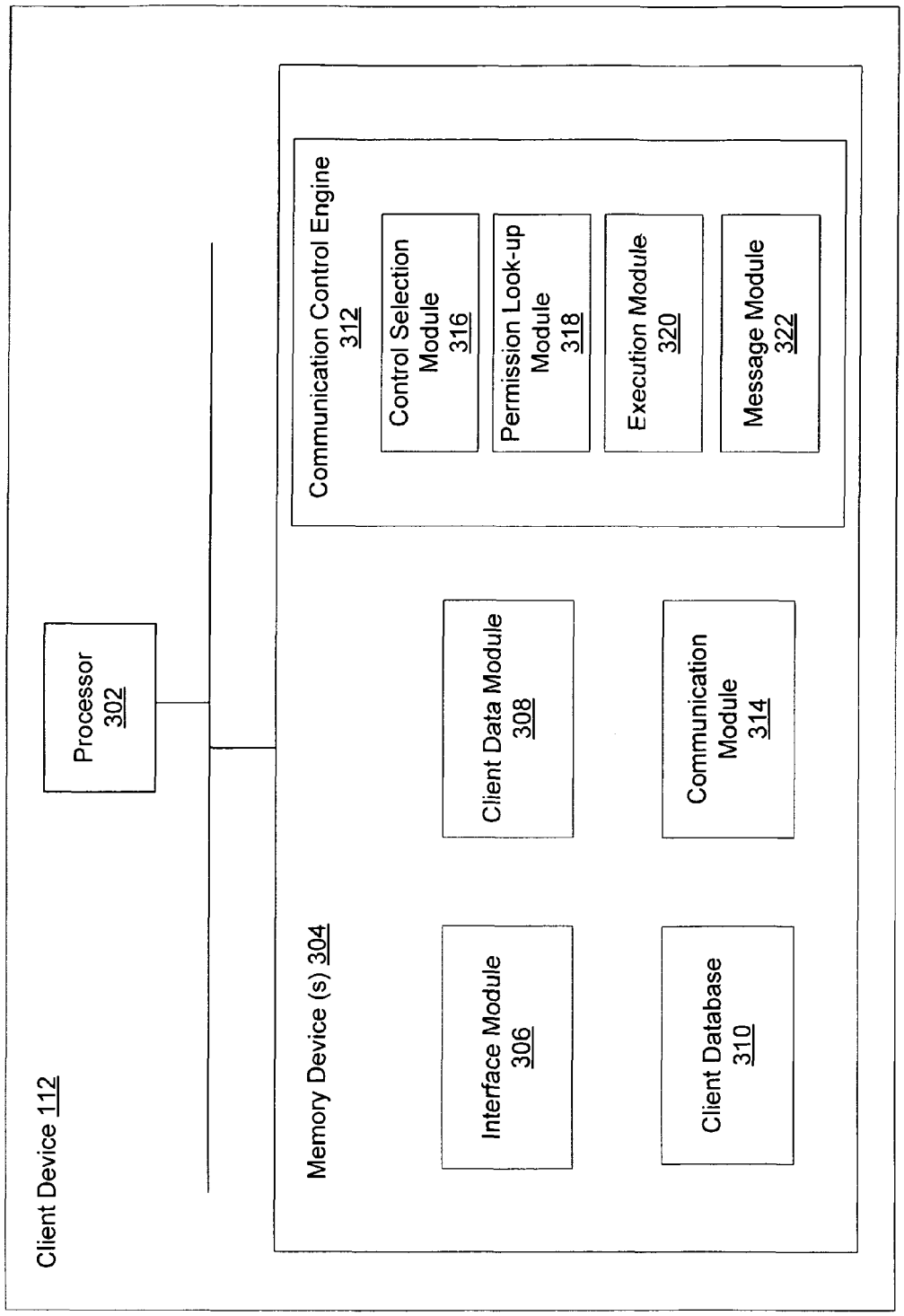
FIG. 3 is a block diagram of an exemplary client device.

The exemplary client device 112 is shown in FIG. 3. The client device 112 comprises a processor 302 and one or more memory devices or storage medium 304. The memory device 304 may comprise an interface module 306, a client data module 308, a client database 310, a communication control engine 312, and a communication module 314. The client device 112 may comprise other components not directly related to functionality of embodiments of the present invention, and thus are not shown or discussed.

The exemplary interface module 306 is configured to provide a user interface that allows for communication establishment, provides status (e.g., presence information and availability), and provides communication control functions. In exemplary embodiments, the interface module 306 will receive and display data from the HUD server 118 (or other server devices) and from the client device 112. For example, presence status data may be received from the HUD server 206 and displayed in the user interface. An example of the user interface is shown and will be discussed in more detail in connection with FIG. 4. In one example, the interface module 306 may launch a user interface such as a browser (e.g., Microsoft Internet Explorer or Mozilla Firefox) that is resident on the client device 112. The browser is then directed to a webpage that displays data from the client device 112 or the HUD server 118 (or other server devices).

In exemplary embodiments, the client data module 308 is configured to receive data broadcasted from the HUD server 118. The data may comprise permissions, profile data, presence information, and any other data that is directed to the client device 112. The data may be stored in the client database 310.

The exemplary communication control engine 312 is configured to allow the individual associated with the client device 112 to perform one or more communication control functions based on permissions established for the individual. As will be discussed in more details below, various communication control functions may comprise drag and drop communications, drag between extensions, communication recording, and communication monitoring. While embodiments of the present invention will be discussed with respect to communications being voice calls, it should be noted that embodiments of the present invention may be applied to any form of communication (e.g., e-mails, instant messaging, SMS, etc.).

In exemplary embodiments, the communication control engine 312 may comprise a control selection module 316, a permission look-up module 318, an execution module 320, and a message module 322. The control selection module 316 is configured to receive a selection of a communication control operation from the individual. Once received, the permission look-up module 318 will access the permissions for the individual. The permission look-up module 318 may then review the permissions to determine if the individual is allowed to perform the communication control operation. If the user does not have permission to perform the communication control operation, the message module 322 may provide a denial indicator to the individual.

If the user is allowed to perform the communication control operation, then the execution module 320 may initiate performance of the communication control operation. In some embodiments, the execution module 320 may send instructions to the communication module 314 or other module associated with the client device 112 to perform the communication control operation. In other embodiments, the execution module 320 may perform the communication control operation, itself.

The exemplary communication module 314 is configured to manage communications at the client level. In some embodiments, the communication module 314 may send a communication request to the HUD server 118 or other communication server to initiate an outbound communication. For example, a communication request may be forwarded to the HUD server 118 and the communication initiation module 216 may then instruct the PBX server 116 to establish a phone call. In other embodiments, the communication module 314 may send instructions to a local module of the client device 112 to initiate the outbound communication. For example, the communication module 314 may instruct an e-mail module of the client device 112 to provide a new e-mail composition window. The communication module 314 may also receive and establish an inbound communication. In other embodiments, the communication module 314 may send instructions to the HUD server 118 or communication servers to move communications between users as will be discussed in more detail in connection with FIG. 4.

Figure 4:
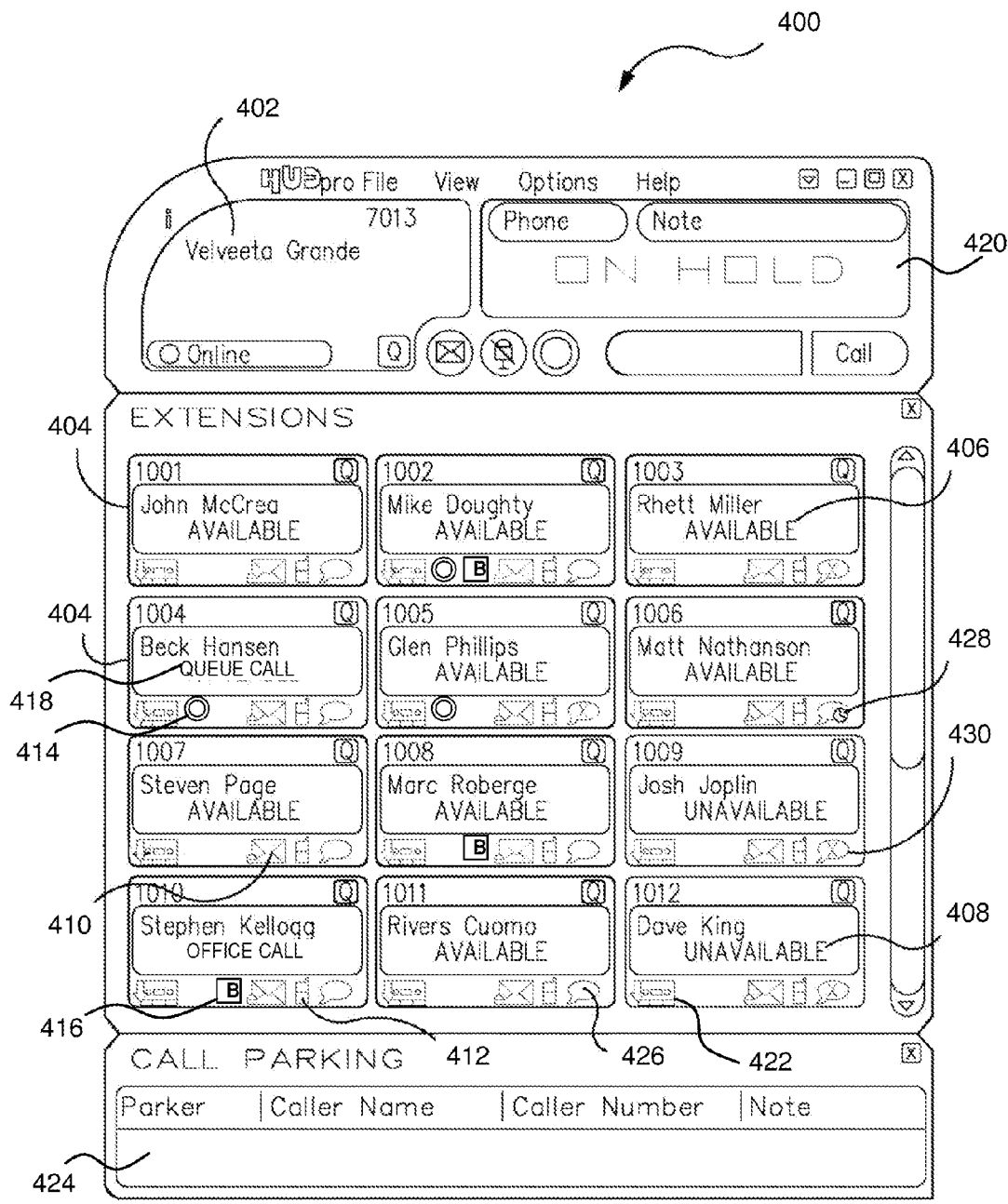
FIG. 4 is an exemplary user interface showing communication control elements.

Referring now to FIG. 4, an example of a communication user interface 400 configured to provide distributed call control is shown. The exemplary user interface 400 displays individuals within the enterprise and their availability, various communication types available, and the present individual's status. In the present example, the individual (i.e., individual using the user interface 400) is identified by name and extension in a top, left display section 402. Local and remote users of the enterprise are displayed in a lower portion of the user interface 400, and may be identified by name and extension within a display block 404. The local and remote users may be organized in any manner, such as by first name, last name, extension number, team (e.g., sales teams, executive team) or group, and so forth.

The presence information of the user interface 400 may be provided on the client device 112 based on the permissions associated with the individual of the client device 112. With respect to availability of a user to receive a phone call, telephone status may be provided within the block 404. For example, an "available" message 406 may be displayed in the block 404 when the user is available to receive the phone call while an "unavailable" message 408 may be provided otherwise. In some embodiments, the block 404 may also be color-coded to indicate availability. For example, the block 404 may be colored blue if the user is available for telephone communications and colored gray if unavailable. Status of a user is important when attempting to drag a communication to/from the user or in monitoring the user.

Within each block 404, a plurality of icons may be provided to show availability for communications and/or provide communication control functionality. The following examples of icons are exemplary and alternative embodiments may utilize other forms and types of icons. Selecting (i.e., clicking on) an e-mail icon 410 may activate an e-mail composition window addressed to the user associated with the block 404 from the individual. A selection of a mobile phone icon 412 may initiate a call to the user's mobile phone. While a phone icon is not shown, the individual may activate a call to the local or remote user by, for example, clicking on an extension number or name within the block 404.

In exemplary embodiments, selectable communication control operations may also be provided on the user interface 400. In one embodiment, the communication control operation comprises selection of a record icon 414 used to activate voice call recording of a user. For example, if the present individual (i.e., Velveeta Grande) selects the record icon 414 of Beck Hansen, assuming the individual has permission, the voice call (i.e., queue call) that Beck Hansen is current conducting will be recorded. The recording may be stored in, for example, the client database 310 of the client device 112.

Another communication control operation may comprise selecting a barge icon 416. The barge icon 416 allows the individual to monitor a communication that the user is currently conducting. For example, if the individual selects the barge icon 416 of Stephen Kellogg, assuming the individual has permission, the individual will be allowed to listen in on the voice call (i.e., office call). In one embodiment, the individual will receive an incoming call indication (e.g., Velveeta Grande will hear a phone ring). When the individual answers the call, the individual is connected into the voice call. The individual may then listen to the voice call but may not be heard by the call participants. In another example, if Stephen Kellogg is currently chatting, the individual may be allowed to view the chat session.

In other embodiments, the communication control operation may comprise a drag operation of communication indicators between various areas of the user interface 400. One such drag operation is a drag between extensions operation. In the drag between extensions operation, the individual may select a communication indicator 418 (e.g., voice call indicator "queue call") from a first user and move it to a second user. In this way, the communication (e.g., the queue call of Beck Hansen) is moved from the first user to a second user (e.g., any other user that is available to receive a voice call).

The communication control operation may comprise other drag operations which may or may not be dependent on permissions. These drag operations may comprise, for example, drag to hold, drag to voicemail, drag to park, and drag and drop communications. The drag to hold operation allows the individual to drag their own communication to a hold section 420 to place the communication on hold. In the drag to voicemail operations, the individual may drag their own communication to a voicemail of another user (e.g., from Velvetta Grande to voicemail (e.g., to a voicemail icon 422) of Dave King. The drag to park operation allows the individual to move the current communication to a call parking section 424. Communications in the call parking section 424 become available to other users within the enterprise. In a drag and drop operation, the individual may move a communication that the individual is currently handling to another user on the user interface 400. For example, Velveeta Grande may move a voice call to Glen Phillips by dragging a communication indicator representing the voice call (e.g., telephone shaped icon) from the top, left display section 402 to the block 404 associated with Glen Phillips. Other drag operations may be provided in further embodiments of the present invention.

With respect to instant messaging or chat, the status and availability of an individual for chat may also be displayed within the block 404. For example, a white chat icon 426 may indicate that the individual is available for chat. Thus, when the user single-clicks the chat icon 426, a chat session will start with the indicated individual. A chat/clock icon 428 may indicate that the individual is away. For example, the user is logged in, but may not be currently using their client device 112. Finally, an "X"ed out chat icon 430 may indicate that the user is not available for chat.

It should be noted that similar clock icons and "X"ed out icons may be utilized to indicate availability to receive phone calls, cellular calls, and e-mails. These statuses are important in situations where drag and drop operations and drag between extension operations are utilized. Also, knowing the communication status of users allows correct recording and monitoring of users.

Various communication control operations have been discussed above. It should be noted that some or all of these communication control operations may be dependent on permissions granted to the individual. For example, if Velveeta Grande attempts to record the queue call of Beck Hansen by selecting the record icon 414 when her permissions do not allow recording with respect to Beck Hansen, then an operation denial indicator may be displayed to Velveeta Grande. In one embodiment, the operation denial indicator may comprise a message that the user does not have permission to perform the operation. Alternatively or in addition to the message, a circle-slash image may be provided. In other embodiments, the denial indicator may comprise a reversal of the selection. For example, if the individual drags a communication indicator from a first user to a second user and the permissions do not allow the individual to drag between these two extensions, then a display of the communication indicator being returned from the second user to the first user may be provided.

It should be noted that the colors, messages, and icons utilized in the embodiment of FIG. 4 are exemplary. Alternative embodiments may comprise the user of other colors, messages, and icons to indicate similar or same statuses and functionality.

Figure 5:
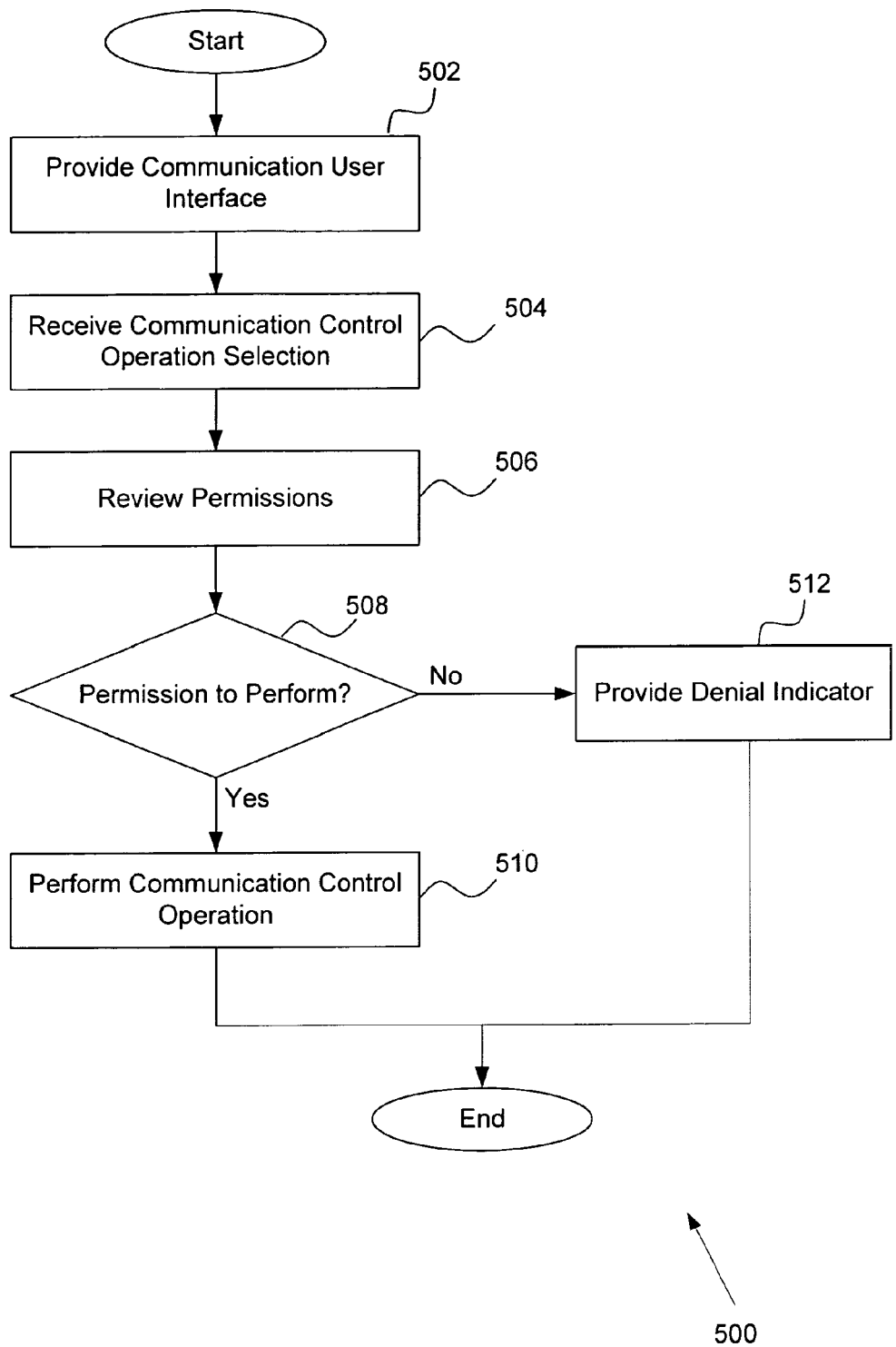
FIG. 5 is a flowchart of an exemplary method for providing distributed communication control.

Referring now to FIG. 5, an exemplary flowchart 500 of a method for providing distributed communication control is shown. In step 502, a communication user interface 400 is provided to the individual associated with the client device 112. In exemplary embodiments, the user interface 400 may be provided by the interface module 306. The user interface 400 may comprise a listing of a plurality of users, both local and remote, with which the individual may have a relationship with (e.g., within the same group or team or has supervisory control over). The plurality of users may be listed within the blocks 404 of the user interface 400 whereby the blocks 404 provide presence/availability information and communication control elements.

In step 504, a selection of a communication control operation is received. In exemplary embodiments, the individual may either select a communication control icon (e.g., record icon 414 or barge icon 416) displayed in the block 404 of a user the individual desires communication control over, or the individual selects a drag operation by dragging a communication indicator between different areas of the user interface 400. The selection, in exemplary embodiments, is received by the control selection module 316.

Permissions for the individual associated with the client device 112 are reviewed in step 506. In some embodiments, the permissions may be locally stored at the client database 310 of the client device 112. In other embodiments, the permissions may be stored at the HUD server 118. The permission look-up module 318 (or 212 in a server enabled system) may review the permissions for the individual with respect to the selected user(s) and the selected type of communication control operation to determine if the individual has permission in step 508.

If the individual has permission to perform the selected communication control operation with respect to the user(s), the communication control operation is performed in step 510. In exemplary embodiments, the execution module 320 may perform or instruct other modules/servers to perform the communication control operation. However, if the individual does not have permission to perform the communication control operation, then a denial indicator is provided in step 512. The denial indicator may be provided by the message module 322.

The above-described components and functions can be comprised of instructions that are stored on a computer-readable or machine-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for providing distributed communication control, comprising:
   providing a communication user interface to an individual, the communication user interface including a plurality of selectable communication control operations configured to provide control over communications of users within an enterprise;
   receiving a selection of one of the plurality of communication control operations from the individual;
   reviewing permissions associated with the individual to determine if the individual is allowed to perform the selected communication control operation;
   if the individual is allowed, performing the selected communication control operation; and
   if the individual is not allowed, providing a denial indicator.

2. The method of claim 1 wherein receiving the selection comprises receiving a drag operation.

3. The method of claim 2 wherein the drag operation comprises a drag between extensions operation.

4. The method of claim 1 wherein receiving the selection comprises receiving a record icon selection.

5. The method of claim 1 wherein receiving the selection comprises receiving a barge icon selection.

6. The method of claim 1 further comprising establishing the permissions for the individual.

7. The method of claim 6 wherein establishing the permissions comprises utilizing a web-based permissions interface.

8. The method of claim 6 wherein establishing the permissions comprises establishing permissions for a team of which the individual is a member.

9. The method of claim 6 wherein establishing the permissions comprises establishing permissions for a group for which the individual has communication control.

10. The method of claim 1 further comprising receiving the permissions and updates to the permissions and storing the permissions in a database.

11. The method of claim 1 wherein the users within the enterprise comprise local and remote users.

12. The method of claim 1 further comprising providing presence status for the users.

13. A system for providing distributed communication control, comprising:
    an interface module configured to provide a communication user interface to an individual, the communication user interface including a plurality of selectable communication control operations configured to provide control over communications of users within an enterprise;
    a control selection module configured to receive a selection of one of the plurality of communication control operations from the individual;
    a permission look-up module configured to review permissions associated with the individual to determine if the individual is allowed to perform the selected communication control operation;
    an execution module configured to initiate performance of the selected communication control operation if the individual has permission; and
    a message module configured to provide a denial indicator if the individual does not have permission.

14. The system of claim 13 further comprising a database configured to store communication control permissions associated with the individual.

15. The system of claim 13 further comprising a permissions interface configured to receive permissions for the individual.

16. The system of claim 13 further comprising a communication initiation module configured to route communications.

17. The system of claim 13 further comprising a presence module configured to provide presence information to a client device.

18. The system of claim 13 wherein the users within the enterprise comprise local and remote users.

19. A non-transitory machine readable medium having embodied thereon a program, the program providing instructions for a method for providing distributed communication control, the method comprising:
    providing a communication user interface to an individual, the communication user interface including a plurality of selectable communication control operations configured to provide control over communications of users within an enterprise;
    receiving a selection of one of the plurality of communication control operations from the individual;
    reviewing permissions associated with the individual to determine if the individual is allowed to perform the selected communication control operation;
    if the individual is allowed, performing the selected communication control operation; and
    if the individual is not allowed, providing a denial indicator.

20. The non-transitory machine readable medium of claim 19 wherein the users within the enterprise comprise local and remote users.

* * * * *